United States Patent
Perez et al.

[19]

[11] Patent Number: 5,911,877
[45] Date of Patent: *Jun. 15, 1999

[54] DEVICE FOR MAINTAINING BACTERIAL LEVELS WITHIN AN ORGANIC WASTE COLLECTION CONTAINER

[75] Inventors: J. Peter Perez; John A. Christiansen, both of Baton Rouge, La.

[73] Assignee: Interbio, Inc., Baton Rouge, La.

[ * ] Notice: This patent is subject to a terminal disclaimer.

[21] Appl. No.: 08/607,718

[22] Filed: Feb. 27, 1996

Related U.S. Application Data

[63] Continuation-in-part of application No. 08/225,007, Apr. 8, 1994, Pat. No. 5,516,687.

[51] Int. Cl.⁶ .................................................. C02F 3/10
[52] U.S. Cl. ..................... 210/150; 210/207; 210/209; 210/538; 435/262; 435/303.1
[58] Field of Search ................................. 210/601, 608, 210/610, 615, 616, 617, 618, 198.1, 532.2, 538, 150, 151, 207, 209; 435/262, 289.1, 303.1

[56] References Cited

U.S. PATENT DOCUMENTS

| | | | |
|---|---|---|---|
| 4,670,149 | 6/1987 | Francis | 210/150 |
| 4,810,385 | 3/1989 | Hater et al. | 210/150 |
| 4,925,564 | 5/1990 | Francis | 210/608 |
| 4,990,449 | 2/1991 | Caissel | 210/615 |
| 5,171,687 | 12/1992 | Moller et al. | 210/610 |
| 5,225,083 | 7/1993 | Pappas et al. | 210/610 |
| 5,516,687 | 5/1996 | Perez et al. | 210/617 |

*Primary Examiner*—Christopher Upton
*Attorney, Agent, or Firm*—Roy, Kiesel & Tucker

[57] ABSTRACT

A device for maintaining effective bacterial levels within a collecting container of an organic matter collection system of the type having a collecting container having a bottom and a liquid to air interface-surface is provided. The bacterial incubator has an enclosure defining an interior, the enclosure adapted to be positioned beneath said liquid to air interface-surface. The enclosure has a plurality of apertures therethrough, the apertures sized to allow the flow of wastewater into the interior of the enclosure. Placed in the interior is a packing having a high surface area. The apertures in the enclosure are sized to retain the packing in the interior. The packing is adapted to allow wastewater to flow therethrough.

8 Claims, 11 Drawing Sheets

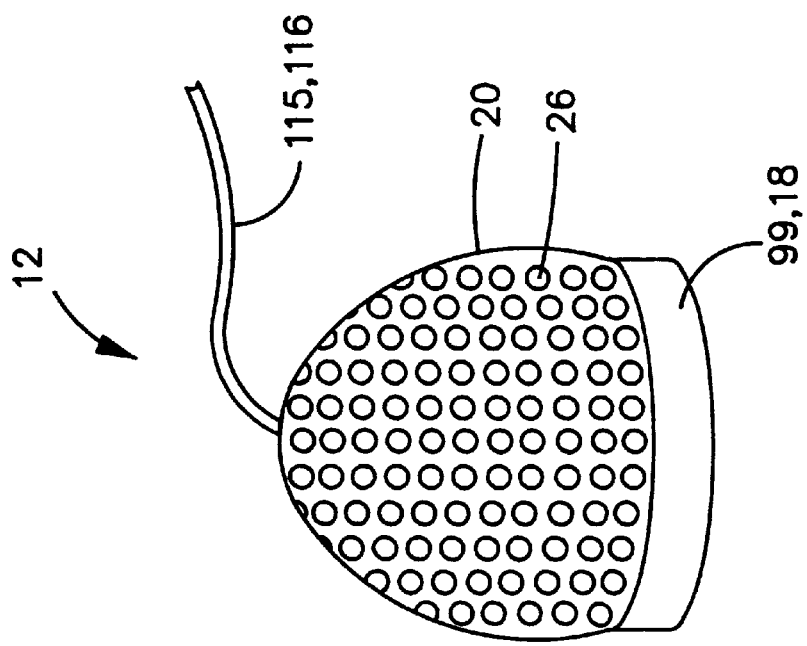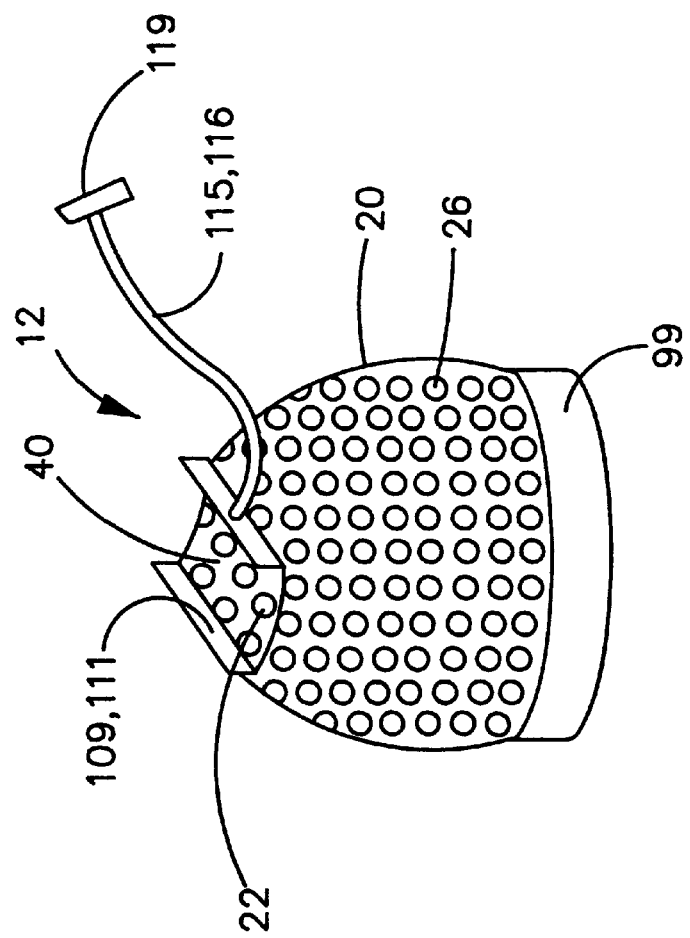

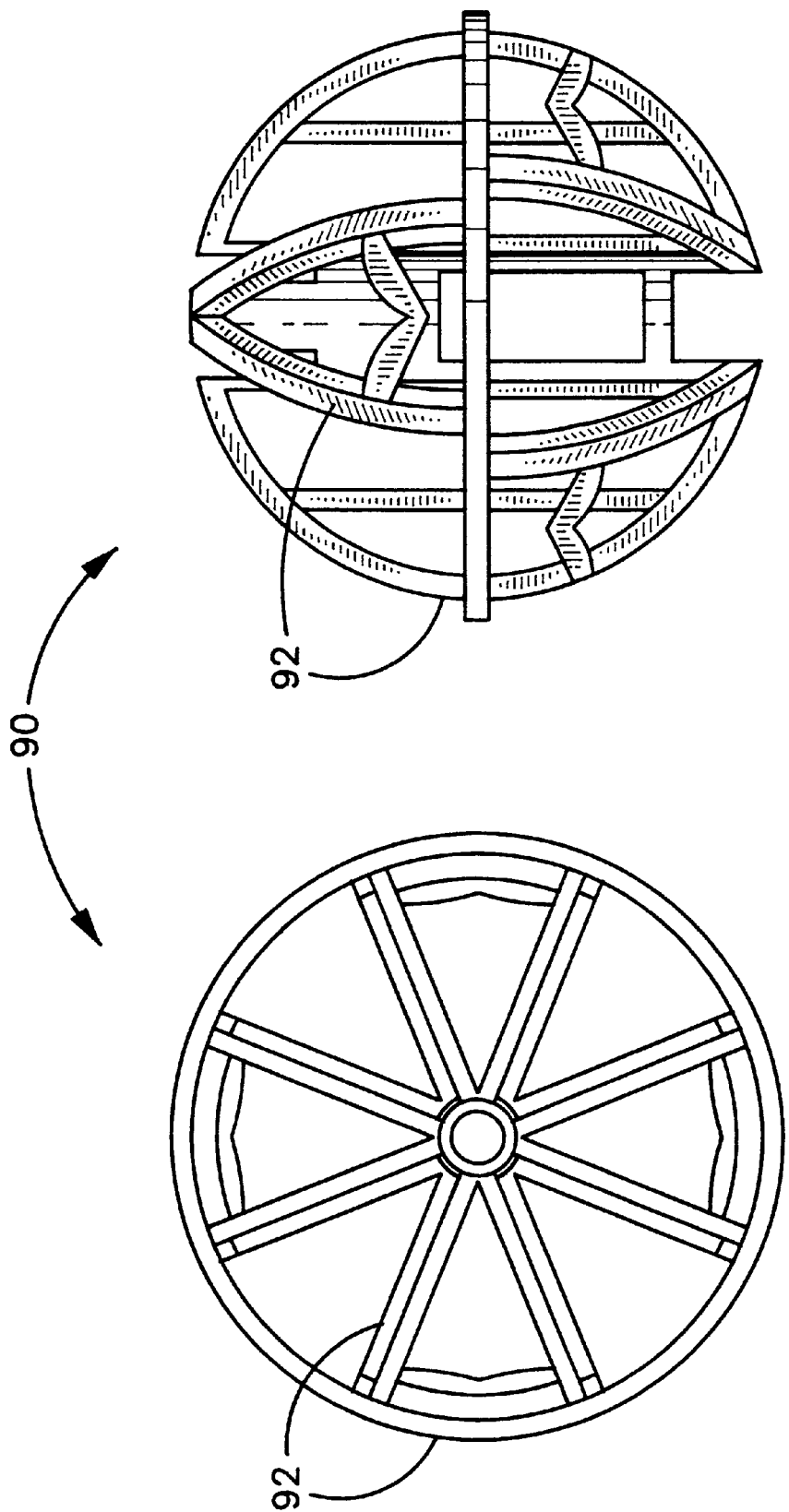

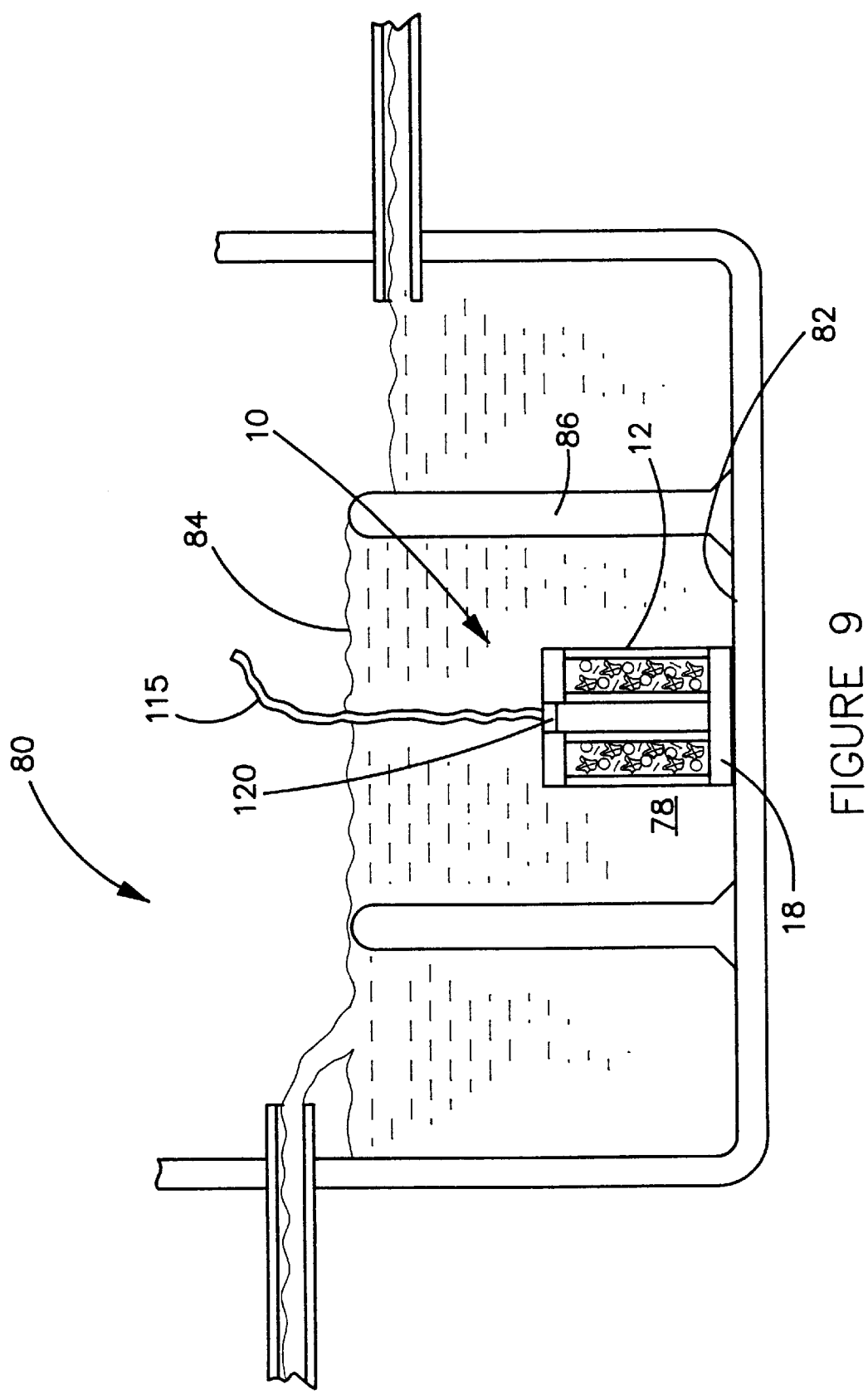

DEVICE FOR MAINTAINING BACTERIAL LEVELS WITHIN AN ORGANIC WASTE COLLECTION CONTAINER

This application is a continuation-in-part of application Ser. No. 08/225,007, filed on Apr. 8, 1994, now U.S. Pat No. 5,516,687.

BACKGROUND OF THE INVENTION

1. Field of the Invention

This invention relates generally to methods and devices used for degrading organic waste and, more specifically to a device for maintaining an effective bacterial level within the collecting chamber of an organic matter collection system.

2. Prior Art

The disposal of the grease and oil generated during the operation of a facility such as a restaurant is becoming increasingly difficult because of the imposition of stringent municipal waste disposal regulations. In the past, a common solution to the disposal problem was to simply pour the waste oils and liquefied grease into a drain connected to the wastewater disposal system. This solution was not without its drawbacks. The grease and oils accumulated within the pipes causing blockages in the lines and sewer backups within the establishment. To minimize these new problems, organic matter collection systems, often referred to as grease traps, are installed within the flow path of the wastewater disposal system. These collection systems have a collecting container that provides favorable conditions for the accumulation of the greases and oils in a specific location. The collecting container is generally accessible to maintenance personnel to allow for removal of the accumulation of grease and oil. Thus, the original problem of disposal has returned.

One solution to the disposal of grease, oil and other organic matter collected within the collecting container of an organic matter collection system is to inoculate the liquid within the collecting container with bacterial cultures containing grease and oil degrading bacteria. The bacteria degrade the greases and oils into compounds which will not cause blockages within the wastewater disposal system and which may be disposed into the wastewater disposal system under the disposal regulations.

Various devices and methods have been designed in an attempt to effectively implement this solution. One method is to prepare and pour a solution containing bacterial cultures into the wastewater disposal system via the drains within the establishment. However, once poured into the wastewater disposal system, some of the bacteria will flow through and past the collecting container and, therefore, requires the use of a large quantity of bacterial cultures; this solution can make maintaining an effective bacterial level within the collecting container both time consuming and expensive to implement.

U.S. Pat. Nos. 4,925,564, 4,810,385 and 4,670,149 disclose other attempts to provide workable devices and methods for maintaining the bacterial level within the collecting container of an organic matter collection system. U.S. Pat. Nos. 4,925,564 and 4,670,149, invented by John Francis, issued on May 15, 1990, and Jun. 2, 1987, respectively, describe methods which include positioning, within the collecting container, a bacterial incubator adapted to float at the air to liquid interface. Bacterial cultures are then added to the wastewater system by preparing and pouring a solution containing the bacterial cultures into the drains within the establishment. However, a large source of potential substrate and nutrients for the bacteria is the organic sediments which collect at or near the bottom of the tank. A device designed to maintain bacterial levels at the air-water interface will not effectively degrade these unwanted organic sediments.

U.S. Pat. No. 4,810,385, invented by Gary Hater, Mark Krupka and Lois Davis, issued on Mar. 7, 1989, describes a porous fabric sock-like member filled with dried bacterial cultures. The sock is placed directly in the path of the waste stream flow. As the waste stream flows through the sock-like member, the dried bacterial cultures or microorganisms are wetted and released into the stream. Because the majority of bacterial cultures or micro-organisms are released during periods of high wastewater flow, using this type of device can result in an expensive loss of bacterial cultures from the collecting container. In addition, replacing spent sock-like members can be objectionable because the sock-like member is usually saturated with sewage.

Another device is the biological incubator described in application Ser. No. 08/225,007. That incubator is designed to rest on or near the bottom of the collecting container. Such a locale provides the bacteria growing in the incubator direct access to the nutrient source present in the bottom of the collecting container. The incubator has a central chamber connected to a feed tube through which the operator charges the incubator with a bacterial insert without removing the housing from the collecting container. However, once the incubator is in place, the operator must access the interior of the collecting chamber to recharge the incubator, which can be a messy task objectionable to some operators. It would, therefore, be desirable to have a device and method for maintaining the bacterial level within the collecting container of an organic matter collection system that will maintain effective bacterial levels within the collecting container below the air/liquid interface, provide the operator with the choice of charging the device with bacteria either from the waste stream or by direct placement of bacteria in the device, that is relatively inexpensive to implement, that is not objectionable to the person practicing the method and that requires only minimal training to use and practice.

SUMMARY OF THE INVENTION

It is, therefore, an object of this invention to provide a device for inexpensively maintaining effective bacterial levels within the collecting container of an organic matter collection system.

It is another object of this invention to provide a device for maintaining effective bacterial levels within the collecting container of an organic matter collection system which is not objectionable to use.

It is another object of this invention to provide a device for maintaining effective bacterial levels within the collecting container of an organic matter collection system which requires minimal training to use.

It is another object of this invention to provide a device for maintaining effective bacterial levels within the collecting container of an organic matter collection system which provides bacterial access to the organic sediments below the air/liquid interface of the collecting container.

It is still another object of this invention to provide a disposable device for maintaining effective bacterial levels within the collecting container of an organic matter collection system.

It is still another object of this invention to provide a dissolvable device for maintaining effective bacterial levels within the collecting container of an organic matter collection system.

It is still another object of this invention to provide a device for maintaining effective bacterial levels within the collecting container of an organic matter collection system which accomplishes some or all of the above objectives.

Accordingly, a bacterial incubator for use in an organic matter collection system of the type having a collecting container having a bottom and a liquid to air interface-surface is described. The bacterial incubator comprises: a housing having an interior and a high surface area member positioned with the interior of the housing. The housing has an exterior surface having a plurality of first apertures therethrough, through which wastewater is flowable. The device may include an area suitable for placement of a bacterial charge by an operator.

The bacterial incubator is constructed of materials which give the bacterial incubator a mass to volume ratio which is sufficient to cause the housing containing the high surface area member to sink near the bottom of the organic matter collecting container and remain there unanchored when in use.

BRIEF DESCRIPTION OF THE DRAWINGS

FIGS. 2a and 2b are perspective views of other embodiments of the bacterial incubator of the invention.

FIG. 3b is a frontal view of the preferred high surface-area member of FIG. 3a.

FIG. 3c is a frontal view of another preferred high surface-area member.

FIG. 3d is a perspective view of a preferred high surface-area member of FIG. 3c.

FIG. 9 is a cross-sectional view of an embodiment of the bacterial incubator of the invention in position within a typical collecting container of a representative organic matter collection system.

DETAILED DESCRIPTION OF PREFERRED EMBODIMENT OF THE INVENTION

For purposes of this application, the term "organic matter collection systems" shall mean any wastewater treatment device having an area for trapping and retaining trapped organic matter from a liquid waste stream. The term "collecting container" shall mean the area of the organic matter collection system wherein the trapped organic matter is retained. The collecting container will have a bottom, an inlet and an outlet. Usually, a collecting container will include an access opening for an operator to access the collecting container, and a cover, sometimes called a manhole cover, to close the access opening. In addition, the term "effective bacterial concentration levels" shall mean at least that concentration of bacteria which will prevent an accumulation of oil and or grease in the collecting container which will form a cap over the air to liquid interface-surface. It should also be understood that the bacterial incubator and method of maintaining effective bacterial levels within the collecting container of an organic matter collection system described herein will also unction in applications wherein organic matter is stored in a liquid form in a container having an air to liquid interface surface. The bacterial incubator of the present invention generally comprises: an enclosure having an interior and an exterior surface with a plurality of apertures therethrough, the apertures sized to allow wasterwater to access the interior, and a high surface area packing positioned in the interior of the enclosure. The enclosure is designed to float below the air/liquid interface, or to rest near the bottom of the collecting chamber.

Figure 1A:
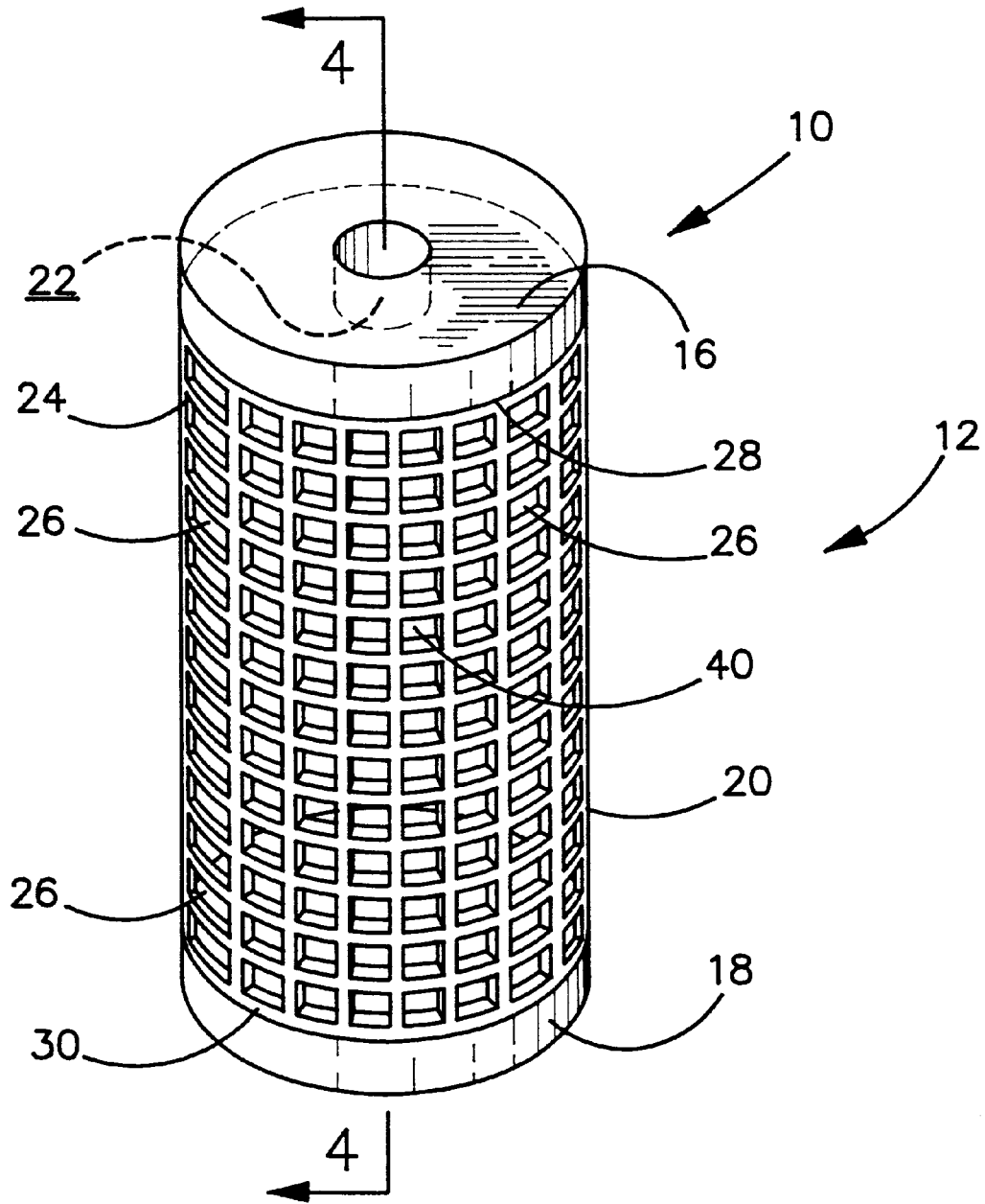
FIG. 1a is a perspective view of the exterior of an embodiment of the bacterial incubator of the invention.

FIG. 1a is a perspective view of a preferred embodiment of the bacterial incubator, generally indicated by the numeral 10, and shows the enclosure, generally indicated by the number 12. As shown in FIG. 1, enclosure 12 includes a top plate 16, a bottom plate 18 and an exterior wall 20. Top plate 16 is disk-shaped and has an access opening 22 formed therethrough to allow access into the interior 40 of enclosure 12. On incubators 10 designed to be seeded by feeding bacteria into the waste stream, access opening 22 is unnecessary. Bottom plate 18 is also disk-shaped and has about the same circumference as top plate 16. In this preferred embodiment, both top plate 16 and bottom plate 18 are constructed from about 2 centimeter thick disk-shaped section of polyvinylchloride, while exterior wall 20 is formed from plastic screening 24. Plastic screening 24 includes a series of flow apertures 26 therethrough.

Other shapes, thicknesses and construction materials may be utilized to practice the invention. For instance, as shown in FIGS. 2a and 2b, enclosure 12 consists of exterior wall 20 having flow apertures 26 therethrough and a weight means 99 positioned to allow the enclosure 12 to rest near the bottom of the collecting container. In this embodiment, exterior wall 20 would form a bag-like device having interior 40. The interior 40 of such an enclosure 12 may be accessible by access opening 22 formed by leaving exterior wall 20 open in a location, the opening closable with a closure means 109, such as a screw cap, clip, string, buttons, or a Velcro-type strip of miniature hooks engagable with miniature clasps 111, as shown in FIG. 2a. Alternatively, interior 40 may be inaccessible to an operator, as shown in FIG. 2b. Weight means 99 is shown attached to exterior of enclosure 12, but could also be placed in interior 40 to act as a ballast; alternatively, packing 41, to be described below, may be weight means 99, acting as a ballast.

Alternative construction materials may also be utilized. For instance, the enclosure 12 may be constructed of materials dissolvable in the wastewater. Bottom plate 18, top plate 16 and exterior wall 20 may be constructed of slow dissolving materials, such as paraffins, cellulose, carbohydrates or silicates. It is preferable that the rate of dissolution of the exterior wall 20 should be faster than the rate of dissolution of plates 16 and 18 to prevent the partially dissolved enclosure 12 from floating and potentially clogging the exit line of the collecting chamber. By constructing the remaining parts of the incubator 10 from dissolvable materials, as will be later described, the incubator 10 is disposable, economic to manufacture, and easy to use by an operator.

Figure 1B:
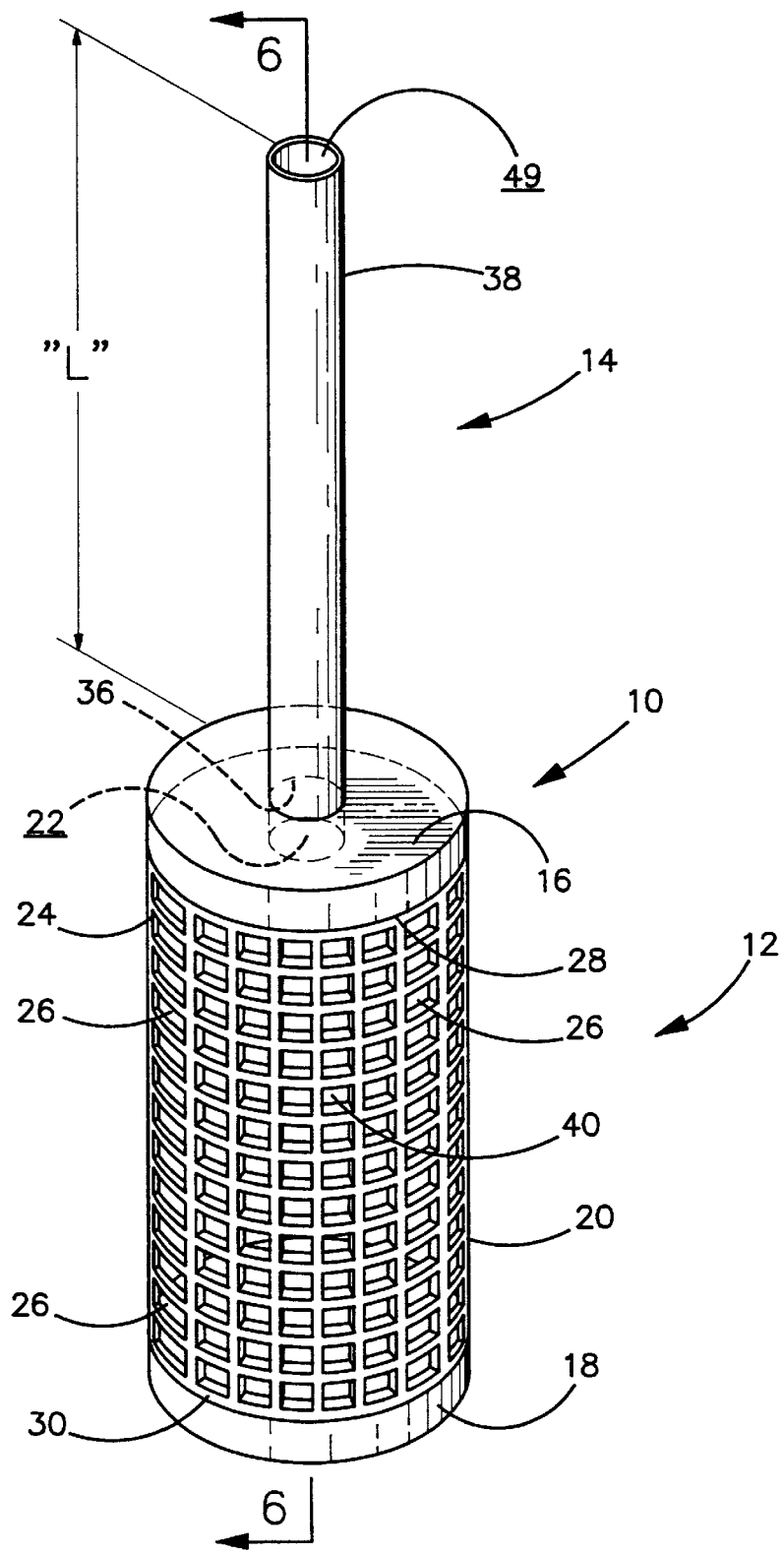
FIG. 1b is a perspective view of the exterior of an embodiment of the bacterial incubator of the invention showing optional an elongated tube.

As shown in FIG. 1b, the incubator 10 may include an optional elongated feed tube 14. Elongated feed tube 14 is constructed from about a sixty (60) centimeter length of polyvinylchloride (PVC) tubing having an external diameter about equal to the diameter of access opening 22. Elongated feed tube 14 is attachable to housing 12 by being threadable into access opening 22 or other methods of attachment, such as a compression fitting. It is important that the length, "L", be selected to allow section 38 of elongated feed tube 14 containing a feed opening 49 to extend past the liquid to air interface-surface of the collecting container.

The incubator 10 also contains packing 41 positioned in interior 40 of enclosure 12. Packing 41 is any material having a high surface area allowing flow of wastewater theretrough, such as a porus glass or plastic matting. For instance, packing 41 may be constructed of a porous polymer substrate, such as available under the trade name Bio-Chemstars from Aquarium Pharmaceuticals, 50 NE. Hamilton, Chalfont City, Pa. Preferably, the packing should be manufactured of a hydrophobic material to allow the organic materials in the wastewater to more readily attach to the packing 41.

Figure 3B:
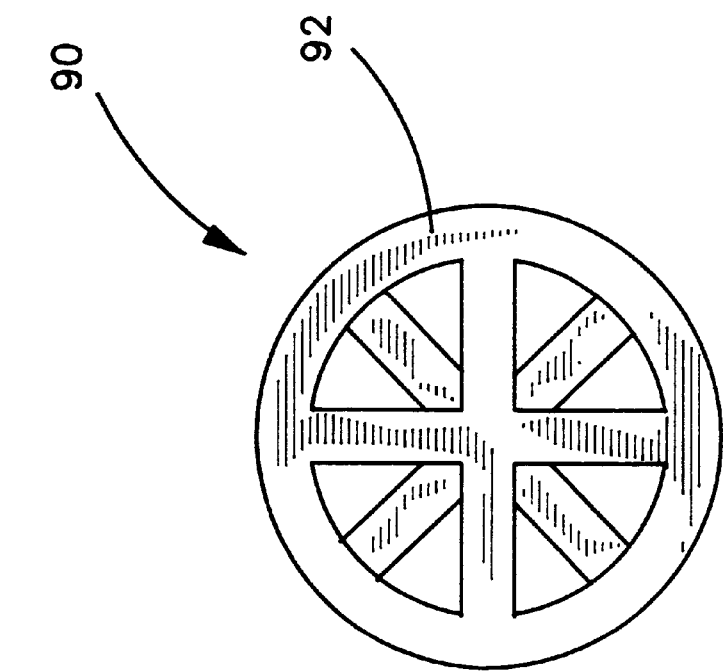
Figure 3A:
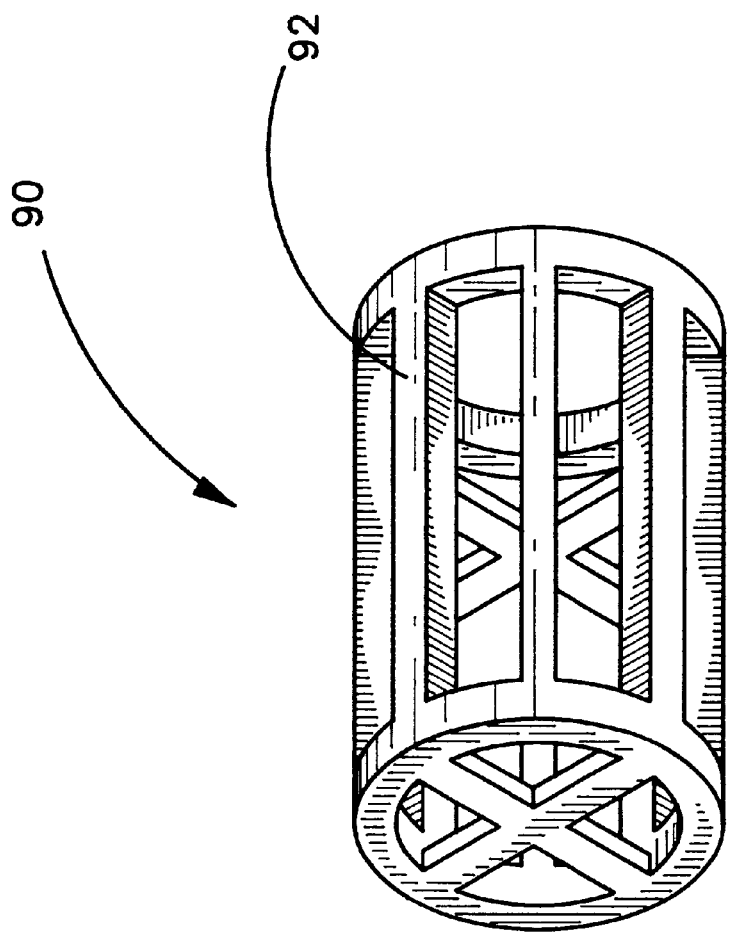
FIG. 3a is a perspective view of a preferred high surface-area member.
Figures 3E, 3F:
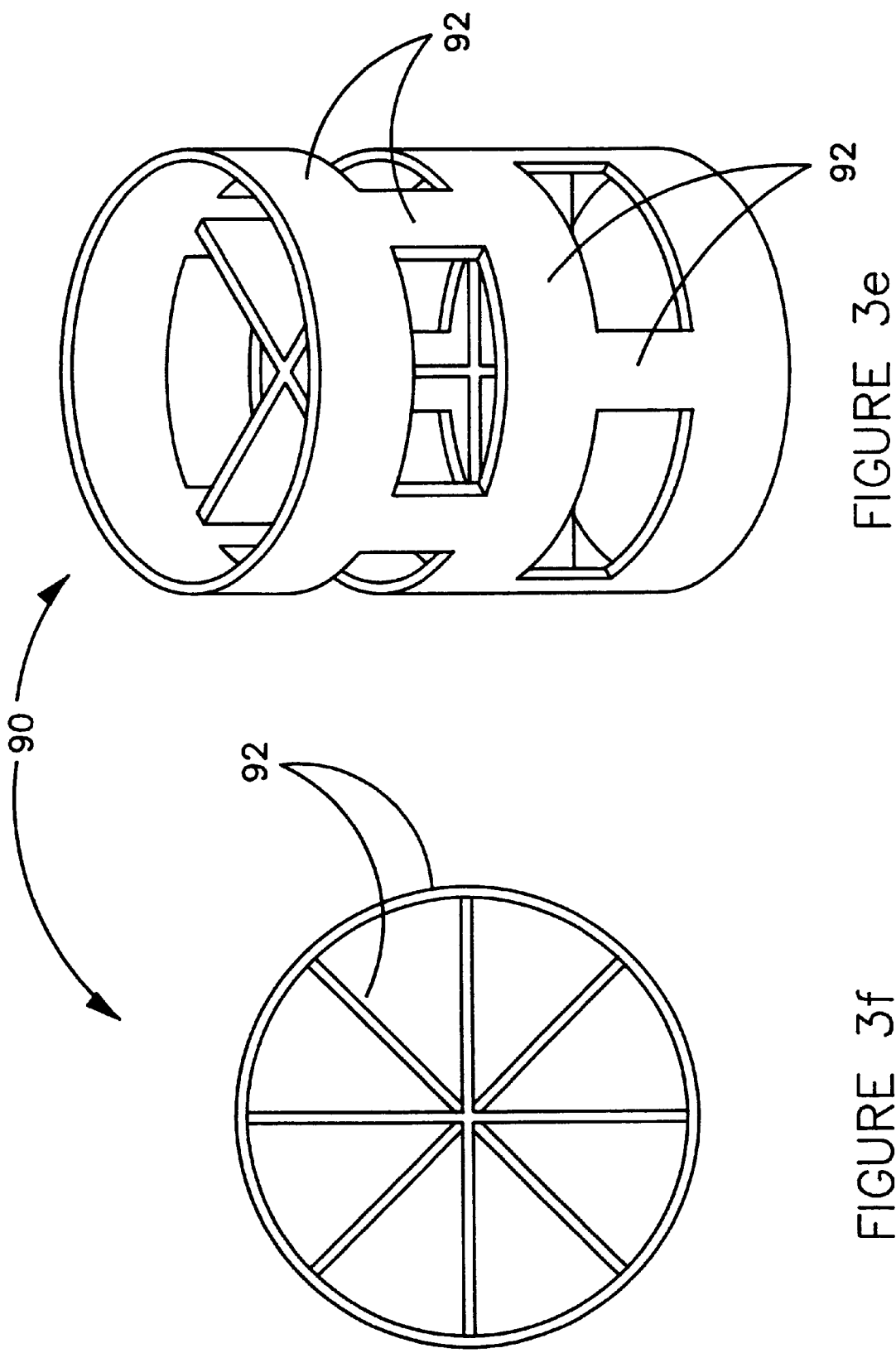
FIG. 3e is a frontal view of another preferred high surface-area member.
FIG. 3f is a perspective view of a preferred high surface-area member of FIG. 3c.

Alternatively, packing 41 may be a semi-rigid structure, such as a honeycomb-like structure having openings therethrough to allow for fluid passage. One such material is mined natural coral, such as that sold under the name Calceagrit by Alpha Environmental Services, at Loughanhill Industrial Estate, Coleraine BT52 2NR Co., Derry, Northern Ireland. Packing 41 may also be a plurality of high surface area members 90. FIGS. 3a, 3b and 3e, 3f show two preferred high surface-area members 90, each being cylindrical in shape; FIGS. 3c, 3d shows another preferred high surface-area member 90, being spherical in shape. FIGS. 3a, 3c, and 3e represent frontal views, while FIGS. 3b, 3d, and 3f represent side elevation views. A quantity of the surface-area members 90 are positioned loosely within the interior 40 of enclosure 12. Each surface-area member 90 can be constructed of an inert plastic and includes a plurality of surface area portions 92. Alternatively, high surface-area members 90 may be composed of diatomite, a naturally occurring substance having a high surface area to body volume ratio, such as sold under the name celites, by Mandeville Corp., P.O. Box 5108, Denver, Co. Surface area portions 92 increase the surface area upon which bacteria may become attached and multiply, but allow liquid to freely circulate within interior 40. Although a variety of commercially available surface-area members may be used to practice the invention, such as cylinders, spheres or other shapes, it is preferred that the surface area to volume ratio of the surface-area members used exceed twenty (20) square meters per cubic meter of surface-area member volume.

Alternatively, packing 41 may be composed of various dissolvable materials, such as paraffins, cellulose, carbohydrates or silicates. The shape or shapes of dissolvable packing 41 will depend upon the material chosen and the ability to mold that material. Dissolvable packing 41 preferably would be used with a dissolvable enclosure 12, as described above, to form a dissolvable and disposable incubator 10.

Figure 4:
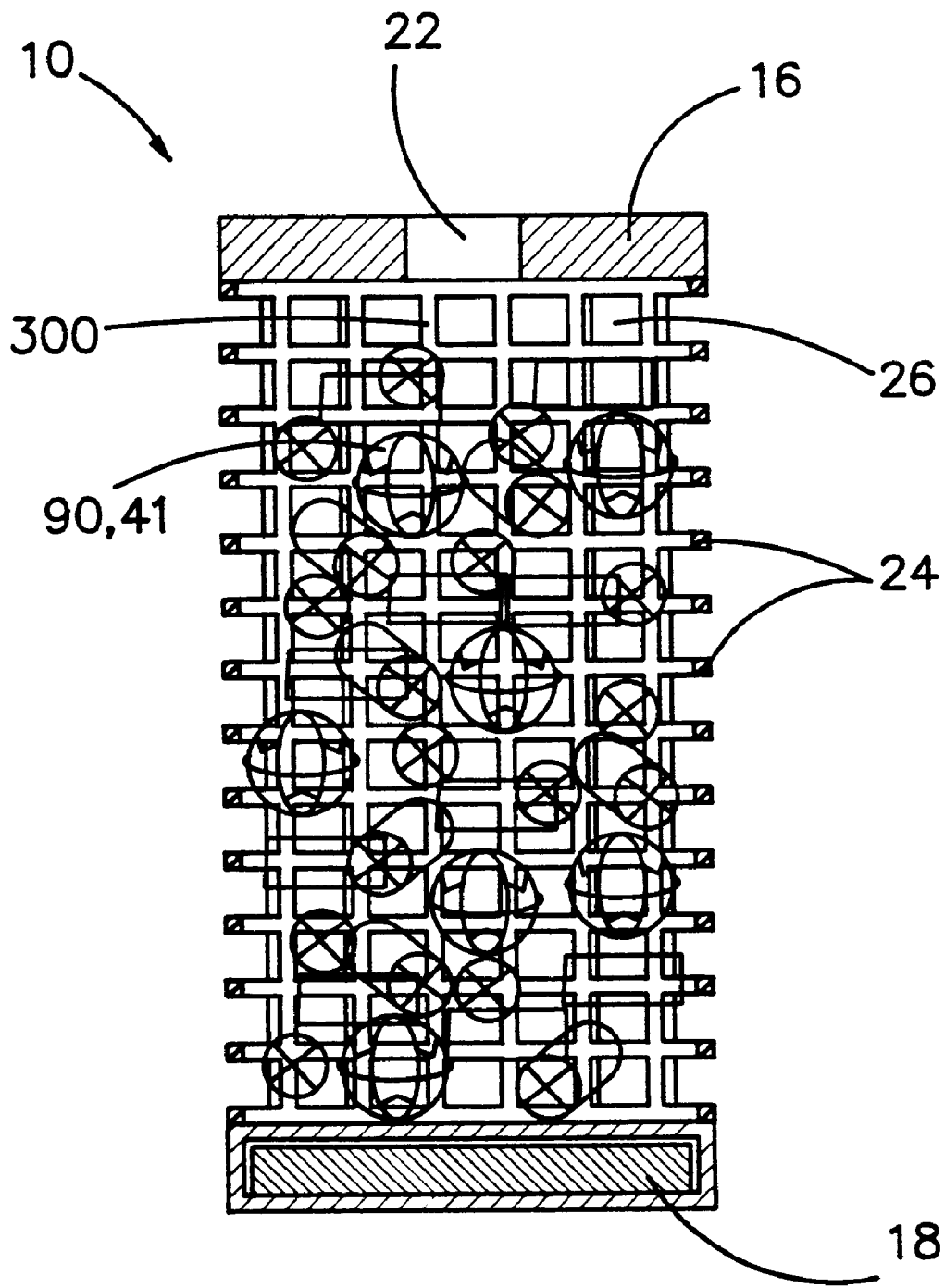
FIG. 4 is a cross-sectional view of an embodiment of the bacterial incubator of the invention shown in FIG. 1 along the line 4—4.
Figure 5B:
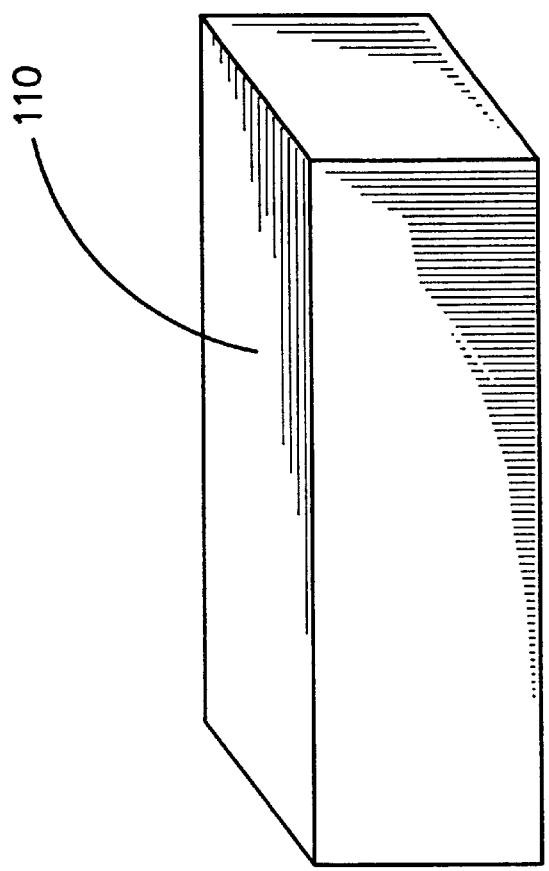
FIGS 5a and 5b are perspective views of a preferred solid cake shape.
Figure 5A:
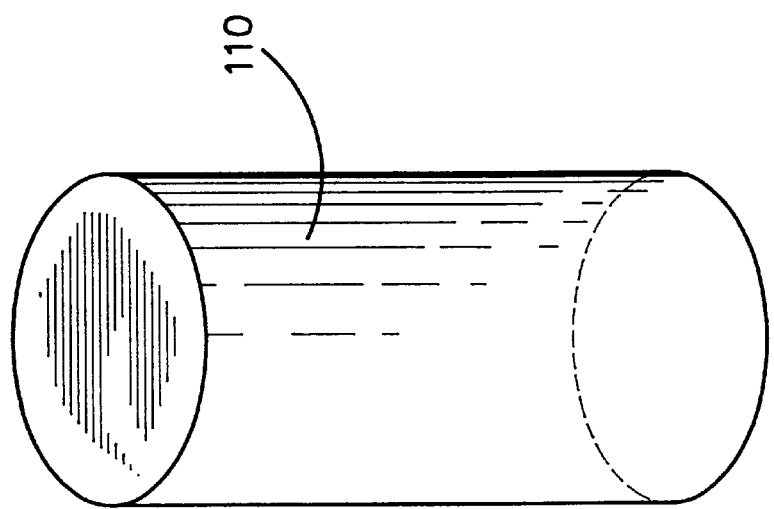

When the incubator 10 is designed to be seeded with a bacterial culture by an operator positioning the culture in the interior 40, the enclosure 12 requires an access opening 22, and it is desired that the enclosure 12 and packing 41 cooperate to form a pocket 300 suitable for placement of such a bacterial culture. As shown in cross-sectional view of FIG. 4, it is preferred that packing 41 does not fill interior 40, but instead, that a sufficient volume of the interior 40 remains void thus forming pocket 300 to accommodate the bacterial culture. The pocket 300 and its location in the interior 40 will depend upon the location of access opening 22 and the nature and shape of the bacterial culture to be positioned in interior 40. For instance, bacterial cultures may be in the form of a solid cake 110 or cakes 110, some possible shapes of such a cake is shown in FIGS. 5a and 5b. The solid cake 110 generally comprises a mixture of a binder, such as plaster-of-paris, bacterial cultures and micro nutrients. The binder should dissolve gradually in water and release the bacterial cultures over a period of time. As solid cake 110 dissolves, it continuously releases bacterial cultures into packing 41. The void which forms pocket 300 should be sufficient to accommodate cake 110, and should be located adjacent to access opening 22 in enclosure 12. As shown in the cross-section of FIG. 4, when packing 41 consists of a plurality of high surface area members 90, pocket 300 may be formed by leaving a portion of interior 40 free of high surface area members 90 so that a void can be created near access opening 22 of sufficient size to accommodate cake 110. Alternatively, when packing 41 is a rigid honeycomb or fibrous matt, the section of that matt or honeycomb adjacent to the access opening 22 should have a void forming pocket 300 shaped to accommodate the cake 110.

Figure 6:
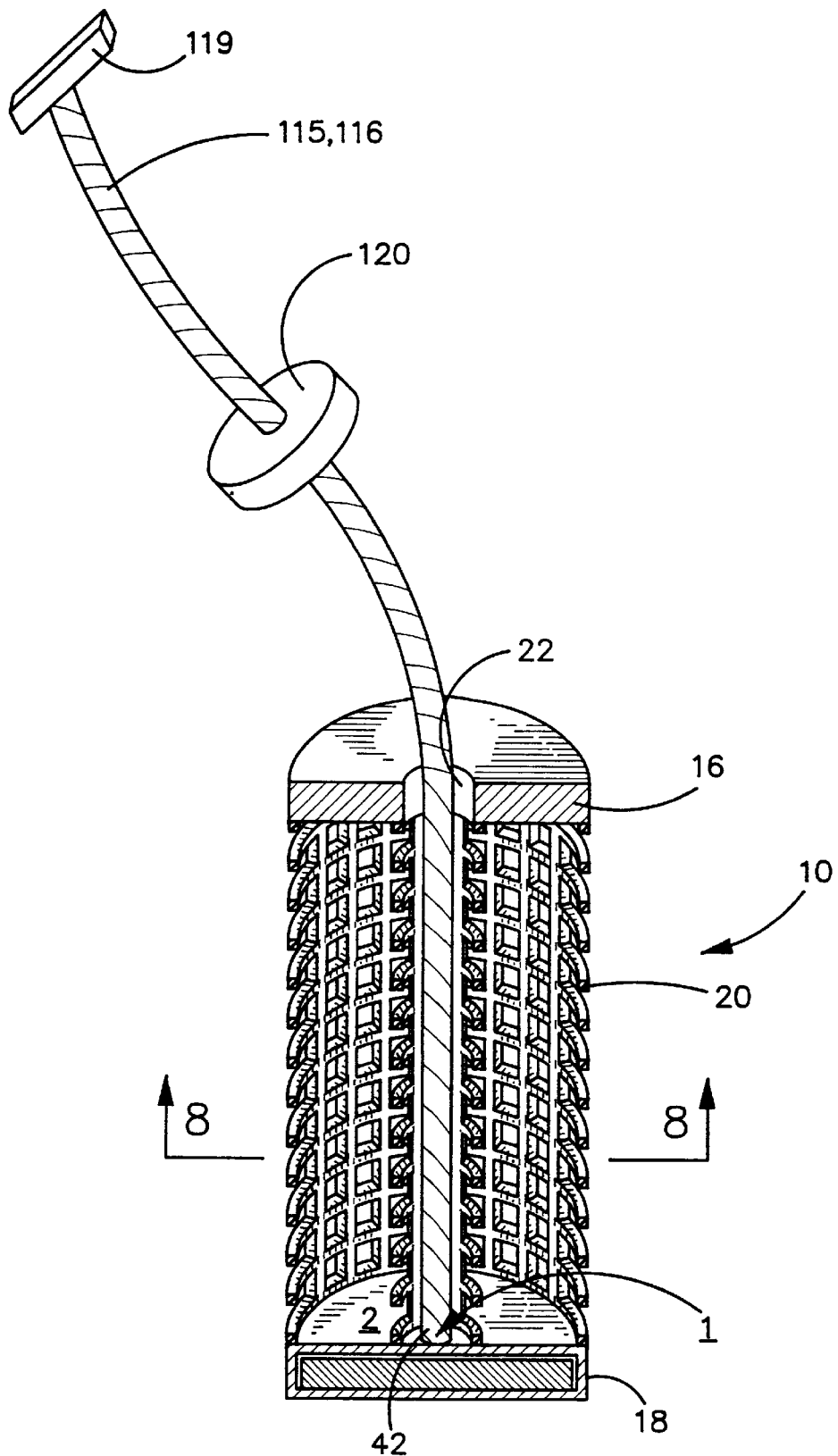
FIG. 6 is longitudinal cross-sectional view of the embodiment of the bacterial incubator of the invention shown in FIG. 1 along the line 6—6.

An alternate embodiment to accommodate the bacterial culture is shown in FIG. 6. FIG. 6 is a longitudinal cross-sectional view of an embodiment of the bacterial incubator 10 and consists of a first chamber 1 positioned in interior 40 of enclosure 12, formed by a common wall 42 connected with top plate 16 and bottom plate 18. Common wall 42 attaches to top plate 16 at access opening 22 and separates the interior 40 of enclosure 12 into a first chamber 1 and a second chamber 2. Common wall is also formed from a rectangular sheet of plastic screening 44 having two opposite sides of a length about equal to the circumference of access opening 22. Plastic screening 44 includes a series of dispersal apertures 46. Packing 41 is positioned in interior 40 of enclosure 12 in second chamber 2. First chamber 1 is sized to accommodate a bacterial culture, such as cake 110. In essence, first chamber 1 is a void which forms pocket 300. As shown, common wall 42 includes a series of dispersal apertures 46 to allow wastewater to flow therethrough and also allows the migration of bacteria contained in cake 110 placed in first chamber 1, through common wall 42, into packing 41 in second chamber 2. Once again, in a filly constructed embodiment, second chamber 2 is filled with packing 41, such as high surface-area members 90; these are not shown in this figure for the purpose of clarity.

Figure 7:
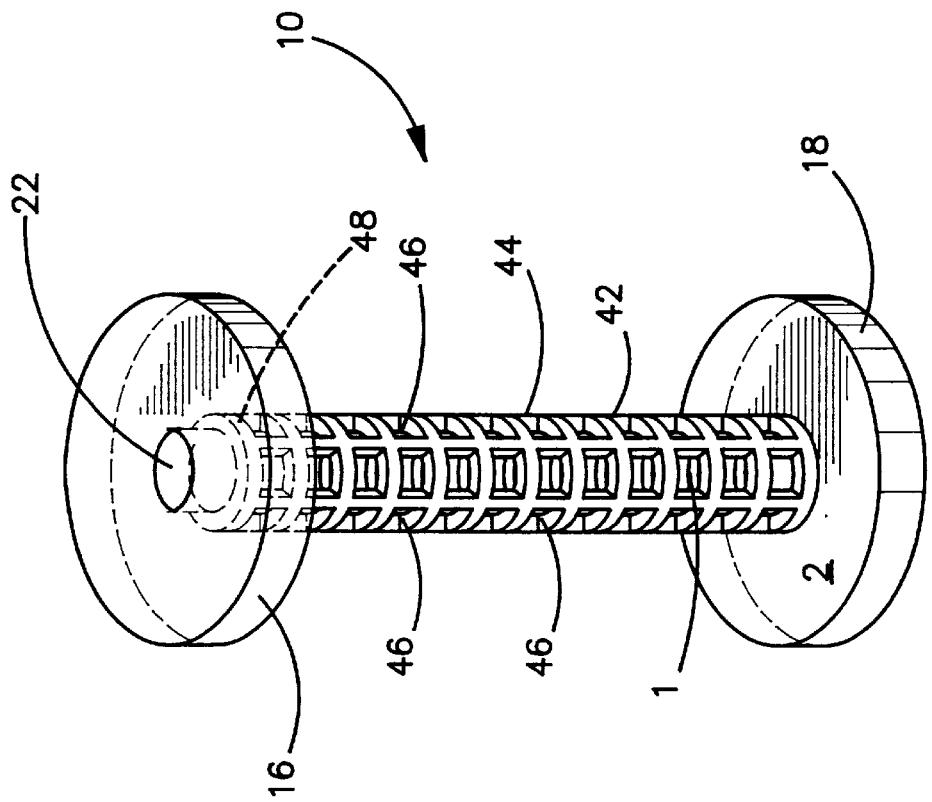
FIG. 7 is a perspective view of an embodiment of the bacterial incubator of the invention with the exterior wall removed.
Figure 8:
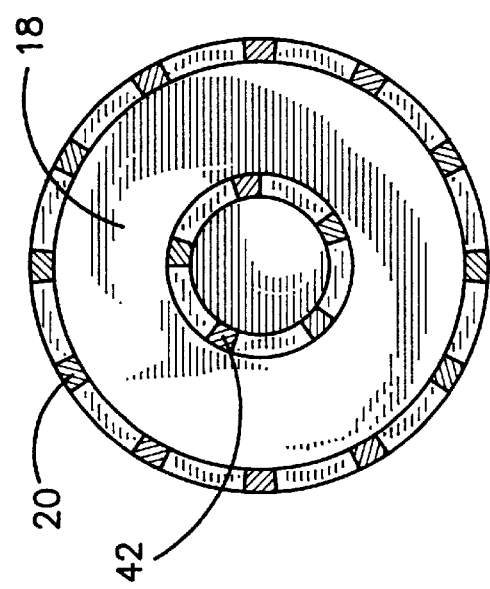
FIG. 8 is a cross-sectional view of an embodiment of the bacterial incubator of the invention shown in FIG. 6 along the line 8—8.

FIG. 7 shows a perspective view of the embodiment of the bacterial incubator 10 shown in cross-section in FIG. 6 with exterior wall 20 removed. A common wall 42 is shown in connection with top plate 16 and bottom plate 18. FIG. 8 is a cross-sectional top oriented view of the embodiment of the bacterial incubator 10 shown in FIG. 6 along the lines 8—8. FIG. 8 shows bottom plate 18, exterior wall 20, common wall 42 and a portion of a first chamber 1 and a second chamber 2. In a filly constructed embodiment second chamber 2 is filled with high surface-area members (shown in FIGS. 3a and 3b), these are not show in this figure for the purpose of clarity.

As shown in FIGS. 2a, 2b and 6, enclosure 12 may have attached thereto a retrieval means 115, such as a rope 116 or chain, to allow an operator to retrieve the enclosure 12 from the collecting chamber. In FIG. 6, retrieval means is a rope 116 attached to bottom plate 18. Also shown in FIG. 6 is aperture cover 120 to cover the access opening 22. Aperture cover 120 is designed to cover the access opening 22 to prevent the loss of cake a 110 from first chamber 1. As shown in FIG. 6 and FIG. 9, rope 116 passes through aperture cover 120, thus providing a means for retaining the aperture cover 120 to the enclosure 12 and prevent separation and loss of cover 120. It is preferred that retrieval means 115 be attachable to collecting container 78 near the operator access opening in the collecting container 78 to allow an operator ready access to the retrieval means 115. For instance, a magnet 119 may be attached to retrieval means 115, so that magnet 119 can be attachable to a metal cover of the access opening of the collecting container 78, allowing for easy retrieval of incubator 10 by an operator.

With reference to FIG. 9, in use, enclosure 12 is submerged beneath the liquid to air interface-surface of collecting container 78. The collecting container 78 includes a container bottom 82. In addition, when filled with wastewater and organic matter, there exists a liquid to air interface-surface 84. The maximum level at which interface-surface 84 exists is generally defined by the design of the particular collection system 80. In this example that level is determined by the height of second weir 86. Bacterial cultures may be added directly to interior 40 of enclosure 12 prior to positioning of incubator 10 in collecting chamber 78. Alternatively, bacterial cultures may be added to wastewater, allowing bacteria to migrate into interior 40 of enclosure 12. Once within interior 40, the bacteria become attached to packing 41 and produce a colony of additional bacteria. It is important to point out that most commercial bacterial cultures contain a variety of bacterial strains. The importance of growing additional bacteria within the particular collecting container 78 can not be overlooked. The growth of bacteria within a collecting container 78 is important because those bacteria for which the environment, within a particular collecting container 78, is best suited will reproduce at greater rates than those bacteria for which the environment is not as well suited. By "best suited" it is meant that the collecting container has favorable temperature and dissolved gas conditions, and contains the type of organic waste that a particular strain of bacteria utilizes for food. Thus, those bacterial strains contained within the commercial bacterial culture that will perform the best job of degrading the waste will thrive and, therefore, be present within the collecting container in greater concentrations.

In terms of the type of bacteria that can be employed in the inventive device and method disclosed herein, some species that are acceptable would include *Bacillus subtilis, Bacillus thuringensis, Pseudomonas aeruginosa, Pseudomonas stutzeri, Pseudomonas putida,* and *Escherichia hermanii,* grown on a suitable carrier, such as bran. However, persons of ordinary skill in this field will understand that the specific bacteria used will depend highly on the type of organic waste, as well as environmental conditions, present within collecting container 78, and will not affect the manner in which the invention accomplishes its objectives.

What is claimed is:

1. A bacterial incubator for use in an organic matter collection system having a collecting container with a bottom, the container having wastewater therein, the system further having a liquid to air interface-surface, said incubator comprising:

(1) an enclosure, said enclosure defining an interior, said enclosure having a plurality of first apertures therethrough, said first apertures sized to allow the flow of wastewater therethrough into said interior;

(2) packing having a high surface area with wastewater flowable therethrough, said packing positioned in said interior of said enclosure, said first apertures in enclosure being further sized to retain said packing in said interior, said packing comprising a plurality of high surface area members, said surface area members being constructed of inert plastic or glass; said bacterial incubator further having a weight means to position said enclosure, when place in said organic matter collection system, beneath said liquid to air interface-surface.

2. A bacterial incubator according to claim 1 further having an retrieval member, said retrieval member being connectable to said enclosure.

3. A bacterial incubator according to claim 2 wherein said retrieval member is a rope.

4. A bacterial incubator according to claim 2 for use in a collecting chamber further having an opening in the container, wherein said retrieval member is attachable to the collecting container near said opening.

5. A bacterial incubator according to claim 4 use in a collecting chamber further having a cover for the opening, wherein said and retrieval member is attachable to the cover.

6. A bacterial incubator according to claim 1 wherein said enclosure has an access opening, said access opening sized to allow an operator to place a bacterial culture in said interior of said enclosure.

7. A bacterial incubator according to claim 6 further having an elongated feed tube having a passageway therethrough, said elongated feed tube attachable to said access opening, said elongated feed tube being of a length such that when said elongated feed tube is attached to said access opening, a section of said elongated feed tube extends above the liquid to air interface-surface of the organic matter collection system.

8. A bacterial incubator according to claim 6 wherein said interior further has a first interior chamber and a second interior chamber, said first and second interior chambers being separated by a common wall, said common wall having a series of second apertures therethrough sized to allow fluid communication between said first and second interior chambers, said access opening and said first interior chamber being positioned so that said access opening opens into said first interior chamber, said plurality of high surface area members being positioned within at least said second interior chamber, said second apertures further sized to retain said packing means.

* * * * *